July 5, 1927.
W. J. LAURINE
1,634,671
BRAKE EQUALIZER
Filed May 20, 1926
2 Sheets-Sheet 2
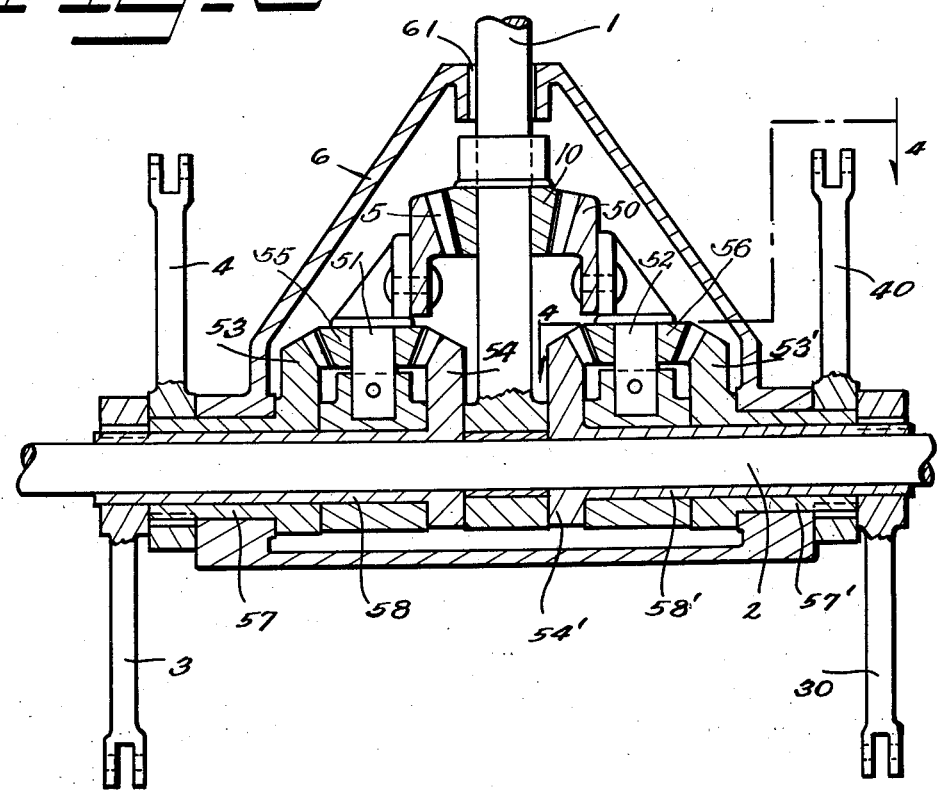
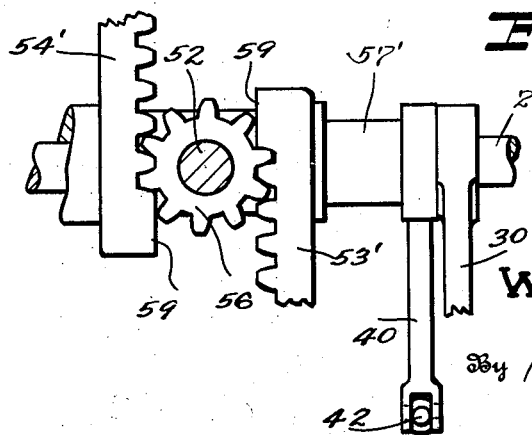
Inventor
William J. Laurine
By H.L. & C.L. Reynolds
Attorneys Patented July 5, 1927.

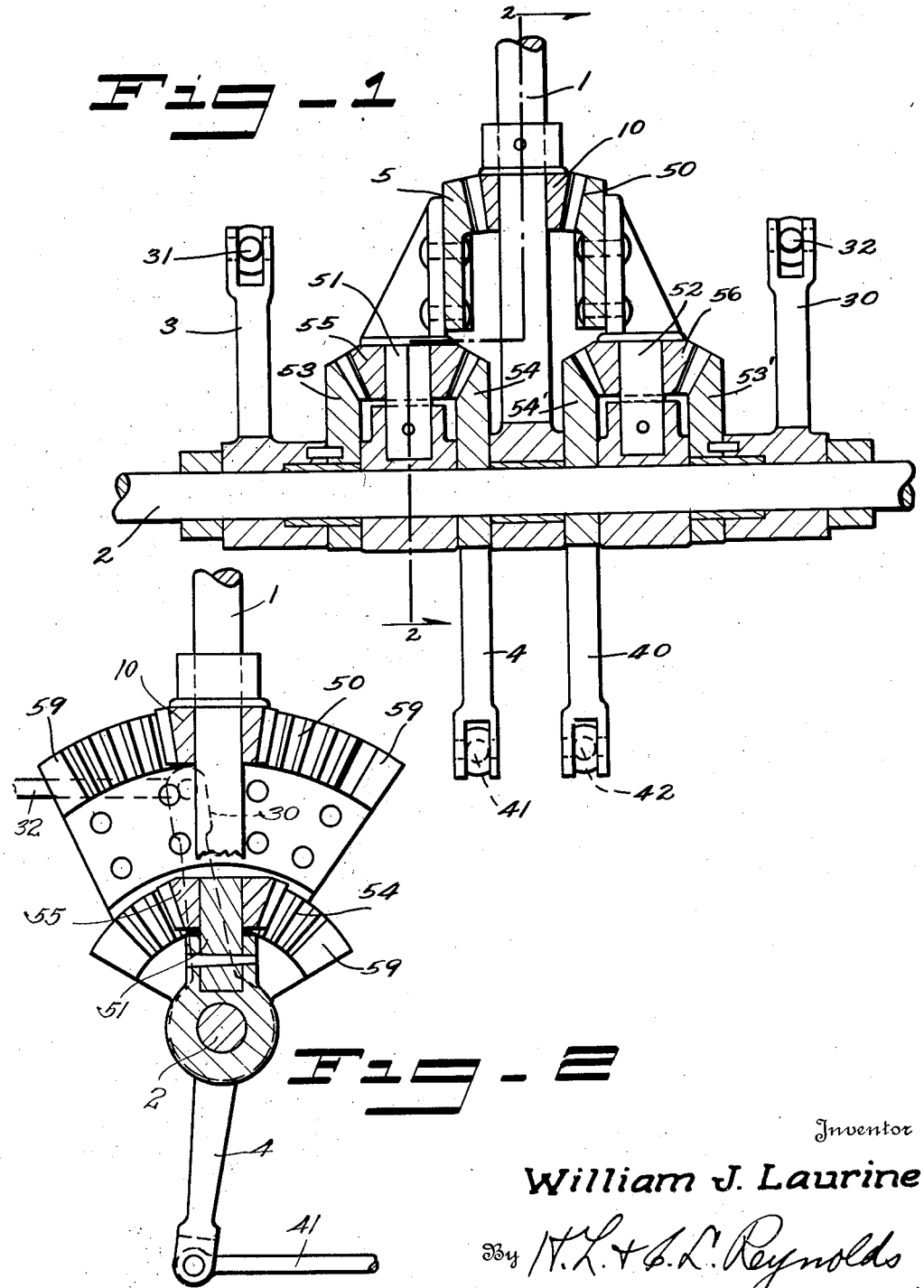

1,634,671

UNITED STATES PATENT OFFICE.

WILLIAM J. LAURINE, OF SEATTLE, WASHINGTON.

BRAKE EQUALIZER.

Application filed May 20, 1926. Serial No. 110,375.

My invention relates to equalizers particularly intended to be employed in connection with the four-wheel brakes now coming into general use on motor cars.

Such brakes are of value in enabling the motor car to be stopped within less distance than with the ordinary two wheel brakes, owing to the fact that the traction of four wheels on the ground, instead of two, is utilized in stopping. However, the employment of four brakes more than doubles the difficulty of maintaining the brakes properly equalized, for two of the brakes are applied to wheels which must be capable of steering movements, and consequently it is extremely difficult to maintain a sufficiently flexible connection and to keep the brakes so adjusted that the movement of the brake pedal will cause each one to be set the same. Unless the adjustment is such that the braking effort is practically equal on all wheels there will be a tendency to skid, especially if the roadway be wet. Further, the brakes on different wheels will wear unequally, due to various conditions, and this requires constant adjustment and in practice renders it impossible to keep the brakes so adjusted that the braking effort on all four wheels is even approximately the same.

My invention is intended, therefore, so to equalize the braking effort applied through movement of a brake lever pedal or like member, that it is evenly divided between the four brakes, and in such a manner that each brake has equally the same braking effort applied to it as all of the other brakes, and this notwithstanding variations due to unequal wear or differences in initial adjustment.

A further object is to provide such an equalizer which will operate even though one or more of the brake rods or connections is broken, and to apply the braking effort equally to the remaining brakes.

My invention comprises the novel parts, and the novel combinations and arrangements thereof, as shown in the accompanying drawings, described in the specification, and particularly defined by the claims terminating the same.

Figure 1 is an axial vertical section through the equalizer.

Figure 2 is a section on line 2—2 of Figure 1.

Figure 3 is a view similar to Figure 1 showing a construction modified to permit it to be encased.

Figure 4 is a detailed view on line 4—4 of Figure 3.

Various arrangements of leverage have been proposed as equalizers, but these become rather complicated when applied to four wheel brakes and have not been found satisfactory. Moreover, if one brake rod breaks, the braking effort may not be applied to the same brake of the pair, or in certain instances the entire braking system is rendered ineffective. For this reason hydraulic transmission of power has been adopted, but this has been found unsatisfactory, due to leakage, either actual or potential, and the dangerous certainty that in case of leakage that the brakes will not operate. I propose to connect the brakes mechanically to the brake pedal, but in such a way that the braking effort is equally applied to each one of the brakes, and in such a way that in case of breakage of the connection to any one or more brakes, the other brakes will all function and will divide the braking effort available equally.

The brake pedal or lever is represented at 1, and is journaled upon a transverse shaft 2. The upper end of this lever is not shown and it will be obvious that it may support a pedal or may be formed as or connected to a hand lever. It is only essential that the lever 1 should be movable relative to or oscillable about the equalizer shaft 2, and by this movement to apply the braking effort or release it.

Also journaled upon the shaft 2 are the pairs of arms 3 and 30, and 4 and 40. The arms 3 and 30 may be the left and right brake arms, respectively, leading to the rear brakes, and the brake rods 31 and 32 are shown connected to the outer ends of the respective arms 3 and 30. The arms 4 and 40 may be, respectively, the arms connecting to the left and right forward brakes, and for this purpose the brake rods 41 and 42 are shown connected at the outer ends of these arms. It is immaterial, however, whether the arms 4 and 40 each connect to the forward brakes, or whether one connects to a forward brake or one to a rear brake, and the same is true to the arms 3 and 30. For example, the arm 3 might be connected to a forward brake, and the arm 40 to a rear brake.

The various arms 3, 30, 4, and 40 are connected to the lever 1 through what may be termed a differential connection. The lever 1 has journaled upon it a bevel pinion 10, which is in continuous mesh with gear segments 5 and 50, mounted upon what are, in effect, arms 51 and 52. These arms are journaled upon the shaft 2 and are placed intermediate adjacent pairs of gear segments 53 and 54; 53' and 54'. These last mentioned segments are formed as part of or are connected to the respective arms 3, 4, 40, and 30 in the order named. Each of the levers 51 and 52 is provided with a pinion 55 or 56 by means of which a differential connection is formed between the arms 3 and 4, or 30 and 40.

According to this arrangement, if the brake lever 1 is moved, the effort is applied to the two arms 51 and 52 through the differential connection formed by the pinion 10 meshing with the segments 5 and 50. Any resistance to movement in one arm 51 or 52 greater than the resistance offered by the other lever will cause rotation of the pinion 10, and consequent relative movement of the levers 51 and 52 until the resistance of the two levers 51 and 52 is equal. Similarly, the effort of the lever 51, for example, is applied to the arms 3 and 4 through the differential connection formed by the pinion 55 meshing with the segments 53 and 54. This will adjust itself so that the resistance of the arms 3 and 4 is equal in the manner described above. The resistance between the arms 30 and 40 will be similarly equalized through the pinion 56, and inasmuch as the resistance of the arms 51 and 52 must be equalized in the manner described above, it will become evident that the resistance on all four of the brake arms is equal, and as this resistance is a measure of the braking effort applied through these arms, it will be evident that the braking effort is the same on each one of the four brakes.

In Figure 1 the connection between the various segments and the corresponding brake arms has been shown as a more or less direct connection, but in Figure 3, the segment 53 has been shown as formed with a sleeve 57 and the segment 53' with a sleeve 57' to which the arm 4 is keyed, and the segments 54 and 54' are provided with like sleeves 58 and 58', respectively, running through the sleeves 57 and 57', to which the arms 3 are keyed. This makes it possible to enclose the entire device within a housing 6, whereby the entire device may be run in grease or oil. A hole or slot 61 at the top accommodates the projecting brake lever 1. If a slot is provided the casing 6 may remain stationary, but if a hole only is provided, the casing may swing with the brake lever. Such an arrangement would permit tight packing at all joints.

It is evident, of course, from the inherent nature of differential mechanism that if one of the members imposes no resistance, such, for example, as would be the case were one of the brake rods 31, 32, 41, or 42 to break, the pinion between the two segments would run off of the end of each of the two segments and the entire equalizer would collapse and become totally ineffective. To guard against this possibility I have provided safety means which will prevent a complete disengagement of any pinion with the two corresponding segments. For example, in Figure 2, the segment 50 is shown as provided with blank ends 59, and in Figure 3 the segments 54' and 53' are shown as provided with similar blank ends 59, whereby the pinion 56 may not run out at the end of either segment, but will come to rest with one of its teeth against the blank end 59. With this arrangement, the pinion may run until it contacts with the blank ends 59, and this contact creates resistance in the differential pair and causes the pair to function, so as to apply the braking effort to the one which is still connected to its brake. Thus, if the arm 30 becomes broken, but the rod 42 remains connected properly, the result will be the application of all of the brakes except that to which the connection is broken. Further, the braking effort will be divided equally among the three remaining effective brakes, reducing the chances of skidding.

Such an arrangement will function irrespective of inequalities in the wearing of the several brakes, for if one wears more than the other brake of a pair, the connecting pinion will cause relative movement between the corresponding segments of the pair, and the inequality will be automatically compensated for.

This principle may be employed with a greater number of brakes, the several brakes being arranged in pairs, in progression, until finally a single pair is connected through the single pinion 10 on the brake lever.

What I claim as my invention is:

1. A multiple brake equalizer comprising, in combination with a plurality of members each adapted for operative connection to its respective brake, and with a member movable to initiate the braking effort, differential means connecting the several first members progressively in pairs to the last member, each of said differential means permitting free relative movement of the various pairs of members within limits, but having limiting means preventing relative movement of the pairs of members therebeyond.

2. A multiple brake equalizer comprising, in combination with a shaft and a plurality of pairs of brake arms journaled upon said shaft, and with a brake lever likewise journaled on said shaft, a gear segment operatively connected to each arm of a pair, and facing towards the gear segment of the other arm of the pair, an arm journaled on said shaft intermediate the segments of a pair, a pinion carried by said latter arms and meshing with both segments of a pair to form a differential connection therebetween, each of said latter arms having a gear segment and being progressively paired with like gear segments on like arms and a pinion on the brake lever meshing with the gear segments of the final pair of arms, each of said segments having blank teeth at its ends engageable by the respective pinions meshing therewith to prevent disengagement of such pinions and to transmit the braking effort through such segments.

Signed at Seattle, King County, Washington, this 13th day of May, 1926.

WILLIAM J. LAURINE.